Aug. 1, 1967 P. L. POWELL 3,333,768
ODOMETER
Filed July 8, 1966

INVENTOR

Patrick L. Powell

By *Norton Lesser*

Attorney

United States Patent Office 3,333,768
Patented Aug. 1, 1967

3,333,768
ODOMETER
Patrick L. Powell, Franklin Park, Ill., assignor to Stewart-Warner Corporation, Chicago, Ill., a corporation of Virginia
Filed July 8, 1966, Ser. No. 563,798
6 Claims. (Cl. 235—96)

ABSTRACT OF THE DISCLOSURE

The following specification describes an odometer in which the odometer dials and drive wheel are all rotatably mounted on a shaft with a pair of spaced collars on the shaft confining the wheel and dials axially on the shaft. The drive wheel successively drives the odometer dials through respective axially restrained pinion gears, and a shoulder is provided on the shaft between the drive wheel and the adjacent odometer dial to prevent side thrust of the drive wheel from being transmitted to the dials and binding one of the dials when the wheel is being driven.

---

The present invention relates generally to an odometer of the revolving type and more particularly to an odometer incorporating means for preventing binding between the revolving parts thereof.

In general, an odometer is used in an automobile speedometer assembly to record distance traveled. The conventional odometer comprises a plurality of odometer figure dials, and is so constructed and geared that as any one dial finishes a complete revolution it turns the next dial one-tenth of a revolution. Normally, one of the outer end odometer dials serves as a primary drive member for the remaining dials and is formed with an integral gear component that is driven by a spiral gear in response to vehicle movement. More specifically, the spiral gear usually has a driving connection with the magnet shaft of the speedometer which in turn has a driving connection with the vehicle transmission.

The foregoing type of odometer has proved disadvantageous because axial thrust forces, which are developed in the primary drive member during rotation thereof, urge the several odometer dials together. This action increases frictional drag between the odometer dials, tends to cause binding thereof, and impairs accurate recordation of the number of revolutions of the dials.

It is an object of the present invention to provide an odometer assembly wherein the primary drive member is independent of the odometer figure dials.

It is another object of the present invention to provide an odometer assembly, as described, wherein the support means for the primary drive member is arranged to resist axial thrust forces developed during rotation of the drive member and directed therefrom toward the odometer figure dials whereby to prevent interruption of normal rotation of the dials.

Now in order to acquaint those skilled in the art with the manner of constructing and using odometers in accordance with the principles of the present invention, there will be described in connection with the accompanying drawing a preferred embodiment of the invention.

Figure 1:
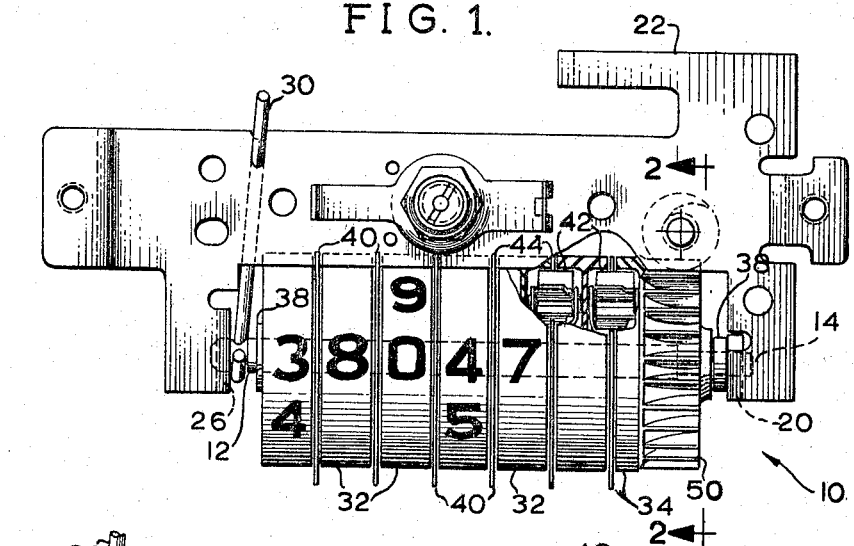
Figure 3:
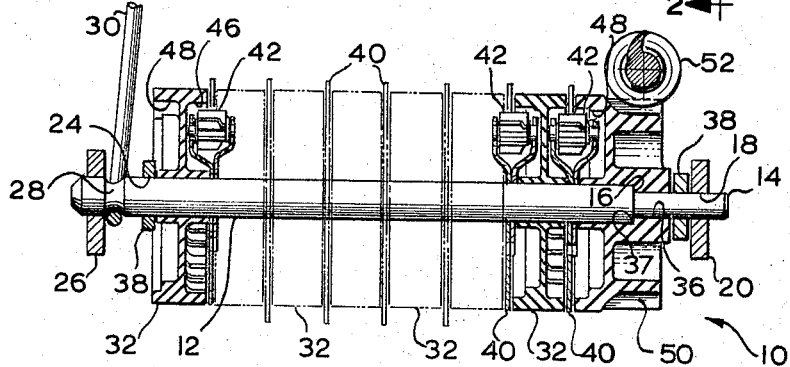
Figure 2:
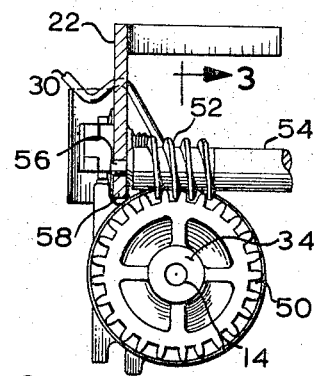

In the drawing:
FIGURE 1 is a front elevational view of an odometer assembly incorporating the principles of the present invention, with portions being broken away to illustrate the interior thereof;

FIGURE 2 is an end view, taken substantially along the line 2—2 of FIGURE 1, looking in the direction indicated by the arrows; and FIGURE 3 is a sectional view, taken substantially along the line 3—3 of FIGURE 2, looking in the direction indicated by the arrows, with certain portions being shown in phantom.

Referring now to the drawing, there is indicated generally by the reference numeral 10 an odometer assembly which comprises a shaft 12 with one end portion 14 thereof being formed of reduced diameter whereby to define an external annular shoulder 16. The end portion 14 is received in an aperture 18 formed in a downwardly turned flange 20 of a support or bracket member 22, while the opposite end of the shaft 12 is received in an open end slot 24 formed in a downwardly turned flange 26 of the support member 22. The shaft 22, adjacent the flange 26, is provided with a groove 28, and a spring clip 30 extends between the groove 28 and the remote edge of the support member 22 for maintaining the shaft 12 in normal operating position within the flanges 20 and 26. In a conventional manner, the support member 22 is mounted in an automobile speedometer assembly.

Rotatably mounted on the shaft 12 are a plurality of axially spaced odometer dials 32 and an independent drive member or wheel 34 adjacent one end of the odometer dials. The peripheries of the dials 32 are provided with figures, numerals or other suitable indicia. The drive wheel 34 has formed therethrough an axial stepped bore 36 which defines an internal annular shoulder 37 that mates with the shaft shoulder 16. Retaining means, in the form of washers 38, are press fitted onto opposite ends of the shaft 12 for axially confining the drive wheel 34 and odometer dials 32 on the shaft 12.

Arranged between the drive shaft 34 and the adjacent odometer dial 32 and between each adjacent pair of odometer dials is gear means comprised of a bracket 40 and a planet pinion 42 rotatable therein. Each bracket 40 has a notched projection 44 that is engaged with the adjacent edge of the support member 22. In this manner, each bracket 40 is maintained stationary. Each pinion 44 extends axially into a portion of both of the adjacent rotatable dials or drive member. The right side of each dial 32 is formed with internal gear teeth 46 that mesh with the adjacent pinion 42. The left side of each dial 32 and of the drive wheel 34 is formed with a single internal gear tooth 48 that is engageable with the adjacent pinion 42. In one revolution of the drive wheel 34 or any given dial 32, the single gear tooth 48 thereof engages the adjacent pinion 42 once and through rotation thereof effects rotation of the adjacent dial 32 one-tenth of a revolution. Thus, the described selectively operable gear means serves as means for transferring rotation of the drive wheel 34 successively to the odometer dials 32.

The drive wheel 34 is formed with peripheral gear teeth 50 that have meshing engagement with a spiral gear 52 formed integrally on a shaft 54. The end of the shaft 54 adjacent the gear 52 is journalled in an aperture 56 formed in a down turned flange 58 of the support member 22, while the other end of the shaft 54 is suitably journalled in a portion of the speedometer frame (not shown). In a conventional manner, the shaft 54 has a driving connection with the magnet shaft (not shown) of the speedometer which in turn has a driving connection with the vehicle transmission. Thus, the drive wheel 34 is driven by the spiral gear 52 in response to vehicle movement, and the odometer dials 32 record distance traveled.

During vehicle movement, the spiral gear 52, which extends transversely of the shaft 12, rotates clockwise as viewed in FIGURE 3. As a result, axial thrust forces are developed at the drive wheel 34 and are directed therefrom to the left. In accordance with the principles of the present invention, these axial thrust forces are resisted by the interengagement of the drive wheel shoulder 37 with the shaft shoulder 16. Thus, the axial thrust forces are not transferred to the odometer dials 32 and interruption of normal rotation of the dials 32 is prevented; frictional drag between the dials is minimized and binding thereof is eliminated.

While there has been shown and described what is believed to be a preferred embodiment of the present invention, it will be understood by those skilled in the art that various rearrangements and modifications may be made therein without departing from the spirit and scope of the invention.

I claim:

1. In an odometer assembly, a shaft, a plurality of axially spaced odometer dials rotatably mounted on said shaft, a drive wheel rotatably mounted on said shaft adjacent one end of said plurality of odometer dials, restraining means permitting only a predetermined axial movement of said dials, means for rotating said drive wheel while subjecting said drive wheel to axial forces, means transferring rotation of said drive wheel successively to said odometer dials with said transfer ring means and odometer dials positioned to transmit said thrust forces to said restraining means, and means integrally formed on said shaft intermediate said drive wheel and the adjacent odometer wheel engaging said drive wheel for resisting axial thrust forces developed during rotation of said drive wheel and directed therefrom toward said plurality of odometer dials to prevent axial movement of said drive wheel relative said shaft against said dials and the transmission of said axial thrust forces to said restraining means whereby to prevent interruption of normal rotation of said plurality of odometer dials.

2. The odometer assembly of claim 1 wherein said integral means on said shaft for resisting axial thrust forces comprises an external annular shoulder on said shaft, and said drive wheel has an internal annular shoulder engaging said external annular shoulder.

3. The odometer assembly of claim 2 wherein said drive wheel is formed with peripheral gear teeth, and said means for rotating said drive wheel includes a spiral gear meshing with said gear teeth of said drive wheel for effecting rotation thereof.

4. The odometer assembly of claim 2 wherein said rotation transferring means comprises selectively operable gear means between said drive wheel and the adjacent odometer dial and between adjacent pairs of odometer dials, and means subject to axial restraint for rotatably supporting said gear means.

5. The odometer assembly of claim 2 wherein said external annular shoulder is defined by the end of said shaft at said drive wheel being formed of reduced diameter, and said internal annular shoulder is defined by an axial stepped bore formed through said drive wheel.

6. For use in an odometer assembly of the type having a shaft rotatably carrying a drive wheel and a plurality of odometer dials arranged in a series extending from one side of said wheel and movable axially against axial restraining means with a gear being provided between said wheel and the adjacent dial and between each pair of dials for rotating said odometer dials successively independently of said shaft in response to the rotation of said drive wheel by a drive gear member imparting an axial load on said drive wheel with said axial load adapted to be transmitted from said drive wheel to said dials and against said restraining means, the improvement comprising means integrally formed on said shaft intermediate said drive wheel and the adjacent odometer dial for engaging said drive wheel to prevent axial movement of said drive wheel relative said shaft in the direction of said odometer dials in response to said axial load for preventing said transmission of an axial load to said odometer dials by said wheel.

References Cited
UNITED STATES PATENTS

| | | | |
|---|---|---|---|
| 1,522,646 | 1/1925 | Osclock | 239—96 |
| 1,797,738 | 3/1931 | Tittensor | 235—96 |
| 1,913,147 | 6/1933 | Zubaty | 235—96 |
| 2,004,881 | 6/1935 | Slye | 235—96 |
| 2,652,199 | 9/1953 | Miner et al. | 235—97 |

RICHARD B. WILKINSON, *Primary Examiner.*

S. A. WAL, *Assistant Examiner.*